United States Patent [19]
Koblížek

[11] Patent Number: 6,125,960
[45] Date of Patent: Oct. 3, 2000

[54] DRIVING GEAR FOR A SINGLE-TRACE VEHICLE

[76] Inventor: Jan Koblížek, Moravské Bránice 124, 664 64 Dolní Kounice, Czechoslovakia

[21] Appl. No.: 09/149,445

[22] Filed: Sep. 9, 1998

[51] Int. Cl.[7] .................................................. B62D 61/02
[52] U.S. Cl. ........................................ 180/219; 180/224
[58] Field of Search ................................ 180/222, 223, 180/224, 226, 233, 256, 251

[56] References Cited

U.S. PATENT DOCUMENTS

| | | | |
|---|---|---|---|
| 3,642,083 | 2/1972 | Rodler, Jr. ................................. | 180/31 |
| 3,746,113 | 7/1973 | Tidwell ...................................... | 180/32 |
| 3,893,533 | 7/1975 | Tidwell ...................................... | 180/31 |
| 4,082,307 | 4/1978 | Tait .......................................... | 280/277 |
| 4,733,742 | 3/1988 | Frye ......................................... | 180/233 |
| 4,903,731 | 2/1990 | Cameron et al. ........................ | 180/252 |
| 5,014,808 | 5/1991 | Savard et al. ............................ | 180/219 |

*Primary Examiner*—Lanna Mai
*Assistant Examiner*—Kevin McKinley
*Attorney, Agent, or Firm*—Blank Rome Comisky & McCauley LLP

[57] ABSTRACT

A driving gear for a motorcycle transfers power to both wheels. The driving gear has a pair of drive trains that are each coupled to one of the wheels of the motorcycle with a spherical joint through conical gears.

5 Claims, 2 Drawing Sheets

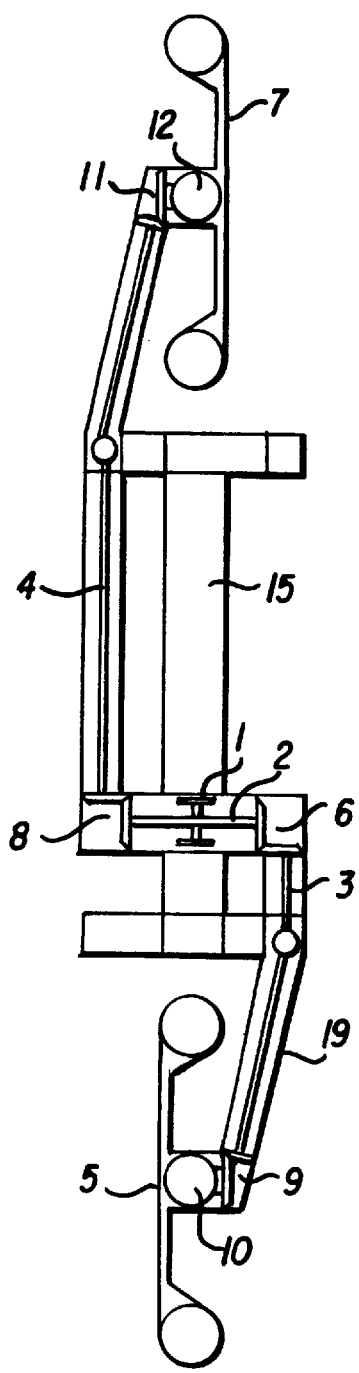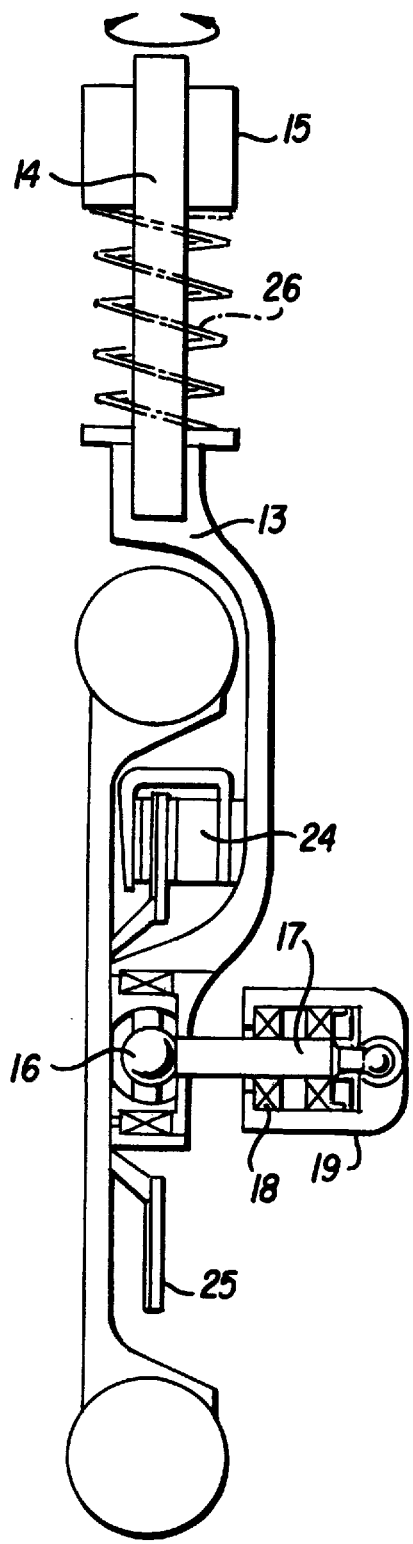
FIG. 1
FIG. 2

DRIVING GEAR FOR A SINGLE-TRACE VEHICLE

TECHNICAL FIELD

The invention relates to a driving gear of a single-trace vehicle, more particularly of a motorcycle, the driving gear for transferring power to both the front and rear wheels.

BACKGROUND OF THE INVENTION

Due to increasing outputs of engines of single-trace vehicles, especially motorcycles, it has become more and more difficult to transfer the driving power of the engine onto the road and thus make full use of the power. The problem has been addressed by design means, namely by gear-box speeds, lower centers of gravity, improved spring arrangements and shock absorbers and also by new tire designs, presenting new rubber mixtures, greater crown width, tires without a pattern, etc.

DISCLOSURE AND OBJECT OF THE INVENTION

It is an object of the invention to improve transmission of the driving power to both wheels. The foregoing problems are solved by a single-trace vehicle driving gear in accordance with the present invention comprising a motor with a gear-box, the output shaft of which is coupled with two drive trains. Each of the drive trains are coupled by means of a conical gearing with one of the two vehicle wheels. Each of the wheels is accommodated in a single swivel rod that is seated in a vehicle frame. Both swivel rods are mutually coupled to each other. Further, in accordance with the present invention, at least one of the vehicle wheels is furnished with a spherical drive joint. The joint is preferably provided with a head that is firmly connected with a drive shaft seated in a bearing and is coupled with an inner segmental ring of the bearing by means of pins and drive stones. The bearing inner ring is mechanically coupled with a corresponding vehicle wheel.

According to one aspect of the invention, motor driving power is provided to both vehicle wheels to allow for improved utilization of the motor driving power. According to another aspect of the invention, the fact that both the front and the rear vehicle wheels may swivel allows for improved vehicle driving properties in turns and provides for decreased turning radius which is otherwise limited by the arrangements of the driving power transmission onto the front vehicle wheel.

BRIEF DESCRIPTION OF THE DRAWINGS

The invention is further illustrated by way of an example presented in accompanying drawings, in which FIG. 1 schematically illustrates arrangement of the driving gear.

FIG. 2 shows an embodiment of a suspension and a drive of a wheel in a partial axial sectional view and FIG. 3 presents a driving spherical joint in a cross sectional view.

DESCRIPTION OF A PREFERRED EMBODIMENT

Figure 3:
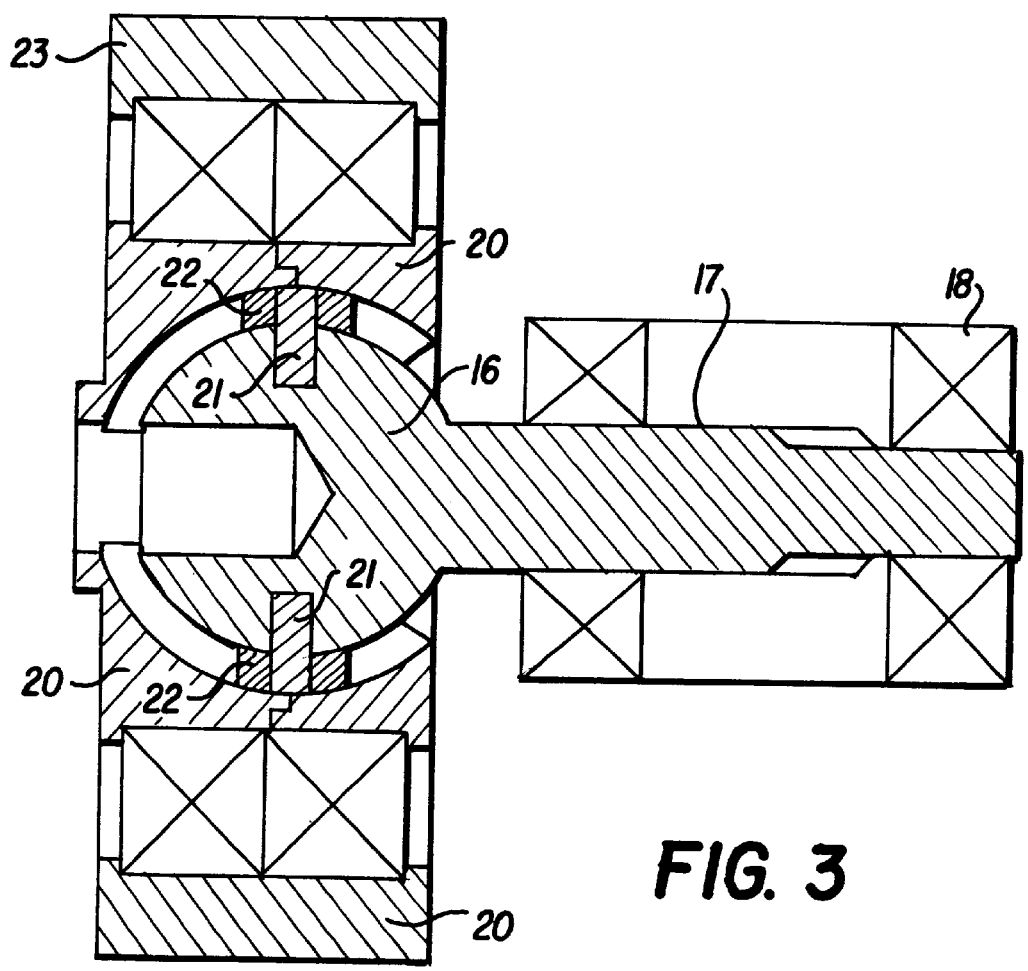

Referring to FIG. 1, there is shown a single-trace vehicle driving gear, namely a motorcycle driving gear for a motorcycle having a motor, which is not shown, and a gear-box, of which only a gear output wheel 1 is presented. The output drive shaft 2 is coupled with two connecting shafts 3 and 4. The coupling with the first connecting shaft 3, which runs in parallel with a vehicle longitudinal axis and extends toward the vehicle rear wheel 5, is performed by means of a first pair 6 of wheels having bevel gearing. The coupling of the output shaft 2 with the second connecting shaft 4, which runs parallel with the longitudinal axis of the vehicle and extends toward the vehicle front wheel 7, is carried out by means of a second pair 8 of wheels with a bevel gearing. On its other end, the first connecting shaft 3 is connected by means of a third pair 9 of wheels with bevel gearing coupled with a rear driving spherical joint 10 that is seated in the rear wheel 5. The second connecting shaft 4 is connected at its other end by means of a fourth pair of wheels 11 with bevel gearing that are coupled with a front driving spherical joint 12, which is seated in the front wheel 7. Both connecting shafts 3 and 4 are supported by longitudinal swing arms (not shown).

As shown in FIG. 2, each of the vehicle wheels 5 and 7 is fixed in a separate swivel rod 13 with a telescoping guide 14 that is attached to a vehicle frame 15 and furnished with a coil spring 26. Both swivel rods 13 are mutually coupled in such a way, that the wheels 5 and 7 swivel in opposite directions in turns. This action not only doubles the wheel swivel angle but allows for smooth driving through a turn, without sliding the rear wheel. Coupling of both vehicle wheels 5 and 7 is carried out by "per se" known means like a steering rod, etc. and is no object of the invention.

As shown in FIGS. 2 and 3, driving power is transmitted to the spherical joints, 10 and 12 which support the vehicle wheels 5 and 7. Each spherical joint 10 and 12 comprises a head 16 that is firmly connected with a driving shaft 17. Torque is transferred through the spherical joints, 10 and 12 to the appropriate pair of wheels, 9 and 11 with a bevel gearing from the adjoining connecting shaft, 3 and 4 respectively. The driving shaft 17 is seated in a secondary bearing 18 that is carried by a longitudinal arm 19. The head 16 is seated in a bearing and is coupled with the bearing segmental inner ring 20 by means of pins 21 and drive stones 22. The inner ring 20 is mechanically coupled with the appropriate vehicle wheel 5 and 7. The bearing outer ring 23 attaches the vehicle wheels 5 and 7 within the swivel rod 13. Each vehicle wheel 5 and 7 is also provided with a disk brake 24 that is mounted upon the swivel rod 13. A brake disk 25 is connected with the respective vehicle wheel, 5 and 7.

What is claimed is:

1. A motorcycle comprising:

a pair of drive trains, an end of each of said drive trains coupled to an output shaft and the other end of each of said drive trains coupled to drive one of two wheels by one of a pair of spherical joints; and a pair of swivel rods connected to a frame, each of said swivel rods being coupled to one of said two wheels.

2. The motorcycle of claim 1, further comprising a pair of wheel bearings, each of said wheel bearings having a segmental inner ring that is coupled to a corresponding one of said two wheels, wherein each of said pair of drive trains includes a drive shaft and each spherical joint includes a head connected to a corresponding one of said drive shafts, each of said wheel bearings being coupled to said head with a set of pins and drive stones.

3. The motorcycle of claim 1, wherein said swivel rods are mutually coupled by a pair of steering rods.

4. A driving gear for a motorcycle having a frame, two wheels, and an output shaft, the driving gear comprising a pair of drive trains, an end of each of said drive trains coupled to said output shaft and the other end of each of said drive trains coupled to drive one of said two wheels by one of a pair of spherical joints.

5. The driving gear of claim 4, wherein each of said pair of drive trains includes a drive shaft and each spherical joint includes a head connected to a corresponding one of said drive shafts, each wheel of said motorcycle having a wheel bearing having a segmental inner ring that is coupled to a corresponding one of said two wheels, each of said wheel bearings being coupled to said head with a set of pins and drive stones.

* * * * *